United States Patent
Lengacher et al.

(10) Patent No.: US 11,216,377 B2
(45) Date of Patent: Jan. 4, 2022

(54) HARDWARE ACCELERATOR AUTOMATIC DETECTION OF SOFTWARE PROCESS MIGRATION

(71) Applicant: NXP USA, Inc., Austin, TX (US)

(72) Inventors: Allen Lengacher, Kanata (CA); David Philip Lapp, Ottawa (CA); Roy Jonathan Pledge, Kanata (CA)

(73) Assignee: NXP USA, Inc., Austin, TX (US)

( * ) Notice: Subject to any disclaimer, the term of this patent is extended or adjusted under 35 U.S.C. 154(b) by 143 days.

(21) Appl. No.: 16/719,356

(22) Filed: Dec. 18, 2019

(65) Prior Publication Data

US 2021/0191867 A1  Jun. 24, 2021

(51) Int. Cl.
  *G06F 12/00* (2006.01)
  *G06F 13/00* (2006.01)
  *G06F 13/28* (2006.01)
  *G06F 12/0842* (2016.01)
  *G06F 13/16* (2006.01)

(52) U.S. Cl.
  CPC ...... *G06F 12/0842* (2013.01); *G06F 13/1668* (2013.01); *G06F 2212/1021* (2013.01); *G06F 2212/608* (2013.01)

(58) Field of Classification Search
  CPC .............. G06F 12/0842; G06F 13/1668; G06F 12/063; G06F 13/404
  USPC ....................................................... 711/119
  See application file for complete search history.

(56) References Cited

U.S. PATENT DOCUMENTS

| | | | |
|---|---|---|---|
| 10,061,534 B2 | 8/2018 | Gupta et al. | |
| 2002/0062425 A1* | 5/2002 | Chauvel | G06F 12/0891 711/130 |
| 2014/0359219 A1* | 12/2014 | Evans | G06F 12/0802 711/118 |
| 2015/0212934 A1* | 7/2015 | Shanmugam | G06F 9/46 711/154 |
| 2019/0042427 A1 | 2/2019 | Raz | |
| 2019/0102303 A1 | 4/2019 | Wang et al. | |

* cited by examiner

*Primary Examiner* — Edward J Dudek, Jr.
*Assistant Examiner* — Sidney Li

(57) ABSTRACT

A mechanism is provided by which a hardware accelerator detects migration of a software process among processors and uses this information to write operation results to an appropriate cache memory for faster access by the current processor. This mechanism is provided, in part, by incorporation within the hardware accelerator of a mapping table having entries including a cache memory identifier associated with a processor identifier. The hardware accelerator further includes circuitry configured to receive a processor identifier from a calling processor, and to perform a look-up in the mapping table to determine the cache memory identifier associated with the processor identifier. The hardware accelerator uses the associated cache memory identifier to write results of called operations to the cache memory associated with the calling processor, thereby accelerating subsequent operations by the calling processor that rely upon the hardware accelerator results.

19 Claims, 3 Drawing Sheets

HARDWARE ACCELERATOR AUTOMATIC DETECTION OF SOFTWARE PROCESS MIGRATION

BACKGROUND

Field

This disclosure relates generally to multi-core processors incorporating hardware acceleration, and more specifically, to a mechanism for a hardware accelerator to write results to an appropriate CPU cache by detecting migration of a calling software process from a first processor to a second processor.

Related Art

Hardware acceleration is a use of computer hardware specially made to perform some functions more efficiently than software instructions executing on a general-purpose central processing unit (CPU). Operations can be computed faster in an application-specific hardware designed or programmed to compute an operation than specified in software and performed on a general-purpose CPU. Hardware acceleration can be generally characterized as an implementation of computing tasks in hardware to decrease latency or otherwise increase throughput.

In a typical system incorporating a hardware accelerator, a general-purpose processor (e.g., a CPU) executes program code that includes an operation call to the hardware accelerator. The hardware accelerator executes the operation associated with the operation call and writes the result of the operation to a cache memory location associated with the calling processor. In this manner, the calling processor has access to the result of the operation for later computation.

In a multi-core system, any one of the core processors can execute program code that includes an operation call to the hardware accelerator. But there are times when a process executing the program code is migrated to another core processor during execution. Traditional hardware accelerators do not have an ability to track process migration and continue to write operation results to the original cache memory associated with the process. Cache coherency operations ensure that the process can continue to access the operation results, by looking for the results in the other caches, but at a cost in speed and efficiency.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism by which a hardware accelerator detects migration of a software process among processors and uses this information to write operation results to an appropriate cache memory for faster access by the current processor. This mechanism is provided, in part, by incorporation within the hardware accelerator of a mapping table having entries including a processor identifier and associated cache memory identifier. The hardware accelerator further includes circuitry configured to receive a processor identifier from a calling processor, and to perform a look-up in the mapping table to determine the cache memory identifier associated with the processor identifier. The hardware accelerator uses the associated cache memory identifier to write results of called operations to the cache memory associated with the calling processor, thereby accelerating subsequent operations by the calling processor that rely upon the hardware accelerator results.

In a traditional multi-core system incorporating a hardware accelerator, operating systems can migrate software processes to different processor cores. If the software process is using the hardware accelerator that targets a specific cache associated with the originating processor core, the hardware accelerator will continue to use that cache after the software process has migrated to a different processor core because traditional hardware accelerators have no mechanism to address software process migration. Further, the operating system itself cannot update an identifier of the target cache for the hardware accelerator because, in general, the operating system will not have knowledge of whether a migrated software process is using an accelerator or which accelerator the process is using. An operating system's task migration functionality is generic and accelerator-specific code is not supported by traditional operating systems. While a cache coherency scheme for the system will allow the new processor core to access the data written to the original cache, there will be a performance penalty associated with the coherency operations. Embodiments of the present invention provide a mechanism for a hardware accelerator to update the destination cache to that associated with a migrated software process.

Figure 1:
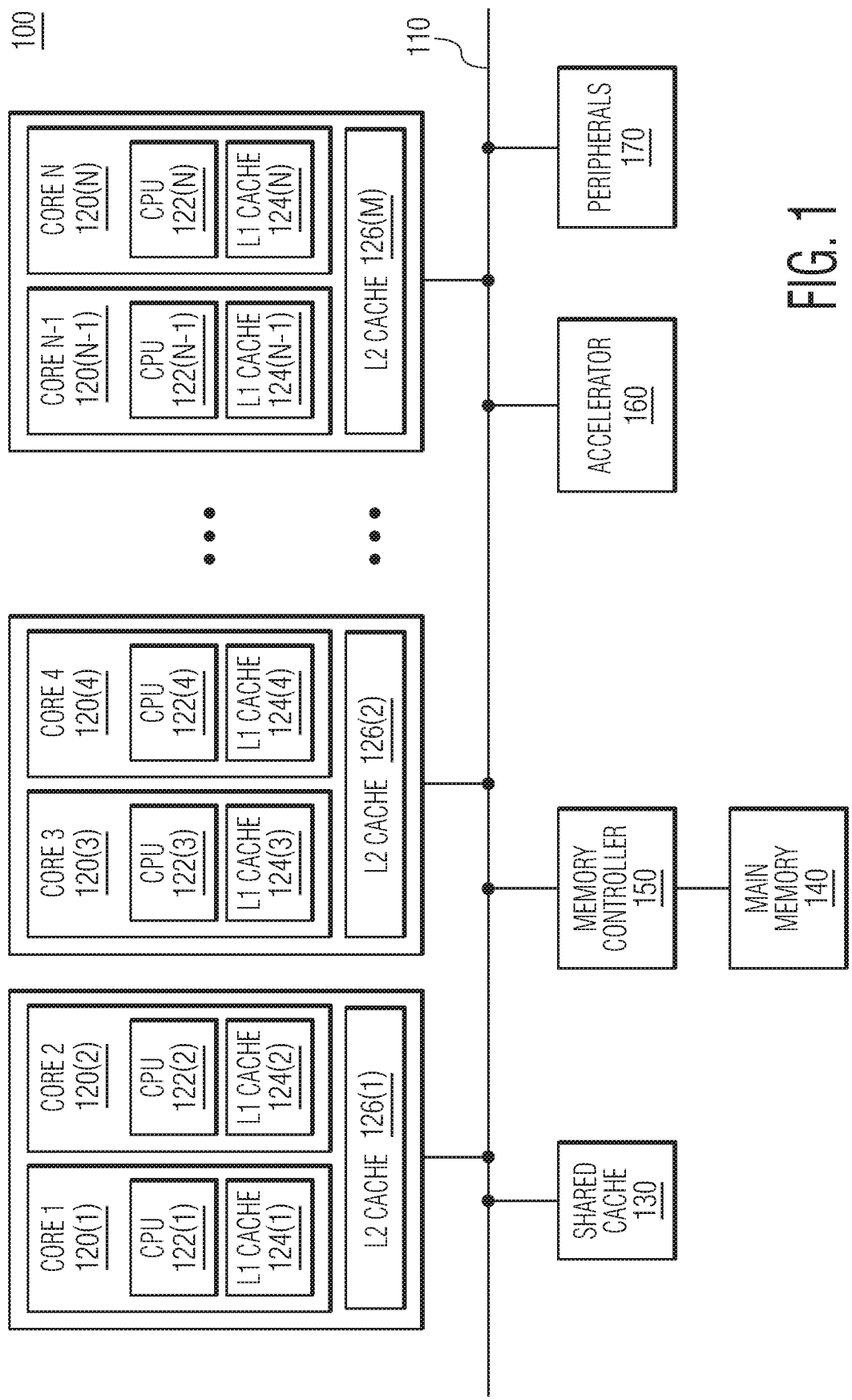
FIG. 1 is a simplified block diagram illustrating an example of a multi-core processor 100 incorporating a hardware accelerator.

FIG. 1 is a simplified block diagram illustrating an example of a multi-core processor 100 incorporating a hardware accelerator. A system interconnect 110 communicatively couples all illustrated components of the multi-core processor. A set of processor cores 120(1)-(N) are coupled to system interconnect 110. Each processor core includes at least one CPU 122 and a local cache memory, L1 cache memory 124. L1 cache memory 124 can store program instructions and data that are used repeatedly in the operation of programs or information that the associated processor core is likely to need next. An additional local cache memory, L2 cache memories 126(1)-(M), is shared by a pair of processor cores. A CPU can access information more quickly from local cache memories than retrieving the information from main memory 140, thereby increasing the overall speed of program execution. In addition, a shared cache 130 is coupled to processor cores 120 via system interconnect 110. This multilevel cache still provides faster access to data than accessing the main memory but can store information that is less used by the processor cores. In addition, as illustrated, shared cache 130 is accessible to all the processor cores and therefore can store information usable by each processor core.

Main memory 140 is also coupled to the system interconnect 110 and accessible to the cores via a memory controller 150. The main memory is typically random-access memory (RAM) in which the operating system and application programs are stored.

Hardware accelerator 160 is communicatively coupled to processor cores 120, shared cache 130, and memory controller 150 and main memory 140 via the system interconnect 110. Through this communicative connection, any of the processor cores can provide instructions to the hardware accelerator. In addition to the hardware accelerator, other peripherals or peripheral controllers 170 are communicatively coupled to interconnect 110. Peripherals 170 can include, for example, circuitry to perform power management, flash management, interconnect management, USB, and other PHY type tasks.

Figure 2:
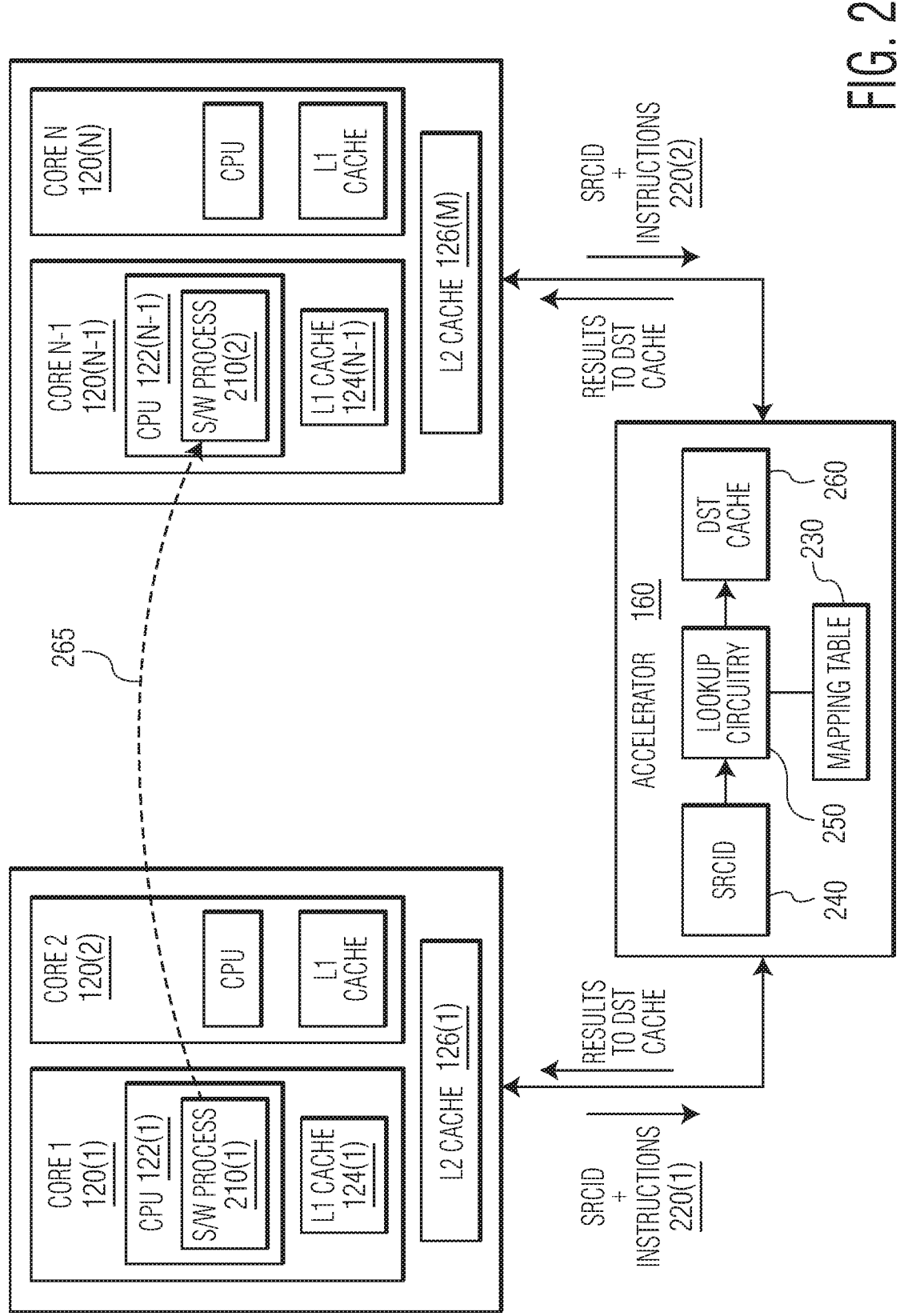
FIG. 2 is a simplified block diagram illustrating an example of a flow of information communicated between processor cores and a hardware accelerator.

FIG. 2 is a simplified block diagram illustrating an example of a flow of information communicated between processor cores and a hardware accelerator, in accord with an embodiment of the present invention. As illustrated in FIG. 1, a processor core 120(1) incorporates a CPU 122(1) and an L1 cache 124(1). Processor core 120(1) also shares an L2 cache 126(1) with a second processor core 120(2). Similarly, a processor core 120(N−1) incorporates a CPU 122(N−1) and an L1 cache 124(N−1), and shares an L2 cache 126(M) with processor core 120(N).

At a first instance, CPU 122(1) executes a software process 210(1). Software process 210(1) can make an operation call 220(1) to accelerator 160 using a memory mapped interface. Operation call 220(1) includes a source identifier of the originating CPU 122(1) along with one or more operation instructions on which accelerator 160 performs processing. In order to identify an appropriate memory cache to write results from the acceleration processing to, accelerator 160 includes a mapping table 230 that stores a set of entries, each of which having a CPU identifier and associated cache identifier pair. Alternatively, the CPU source identifiers can be an index to a table storing the associated cache identifiers. Each CPU 122(1)-(N) has a corresponding entry in mapping table 230, and each entry provides an identifier of a local cache associated with the CPU (e.g., L1 cache 124(1) or L2 cache 126(1) for CPU 122(1)). Accelerator 160 reads the source identifier of the originating CPU in operation call 220(1) and stores that source identifier in SRC ID register 240. In one embodiment, lookup circuitry 250 can compare the information in SRC ID register 240 with the CPU identifiers of the entries in mapping table 230. In another embodiment, the lookup circuitry can use the SRC ID in an index lookup of the table to find the associated cache identifier. Once a match is found, an associated destination cache identifier of the matching entry can be stored in a DST CACHE register 260. The accelerator processing results can then be written to the destination cache identified by the mapping table (e.g., L1 cache 124(1) or L2 cache 126(1)), and be accessible to CPU 122(1).

At a subsequent time, the operating system may move software process 210(1) to another processor core 120(N−1) during normal operation (265). Such a move may be performed in response to a heightened load experienced by processor core 120(1), other load balancing operations, hypervisor operations, and the like. At the new core, the software process is labeled 210(2), representing the resumption at the second time of software process 210(1) in CPU 122(N−1). Resumed software process 210(2) makes an operation call 220(2) to accelerator 160 via a memory mapped interface. Operation call 220(2) now includes a source identifier of the originating CPU 122(N−1) along with one or more operation instructions on which accelerator 160 performs processing. As above, accelerator 160 reads the source identifier of the originating CPU in operation call 220(2) and stores that source identifier in SRC ID register 240. In one embodiment, lookup circuitry 250 compares the information in SRC ID register 240 with the CPU identifiers of entries in mapping table 230 or performs an index lookup. In an alternative embodiment, the lookup circuitry can use the information in the SRC ID register for an index lookup of the mapping table. Once a match is found, the associated destination cache identifier can be stored in a DST CACHE register 260. The accelerator processing results can then be written to the destination cache identified by the mapping table (e.g., L1 cache 124(N−1) or L2 cache 126(M)).

Figure 3:
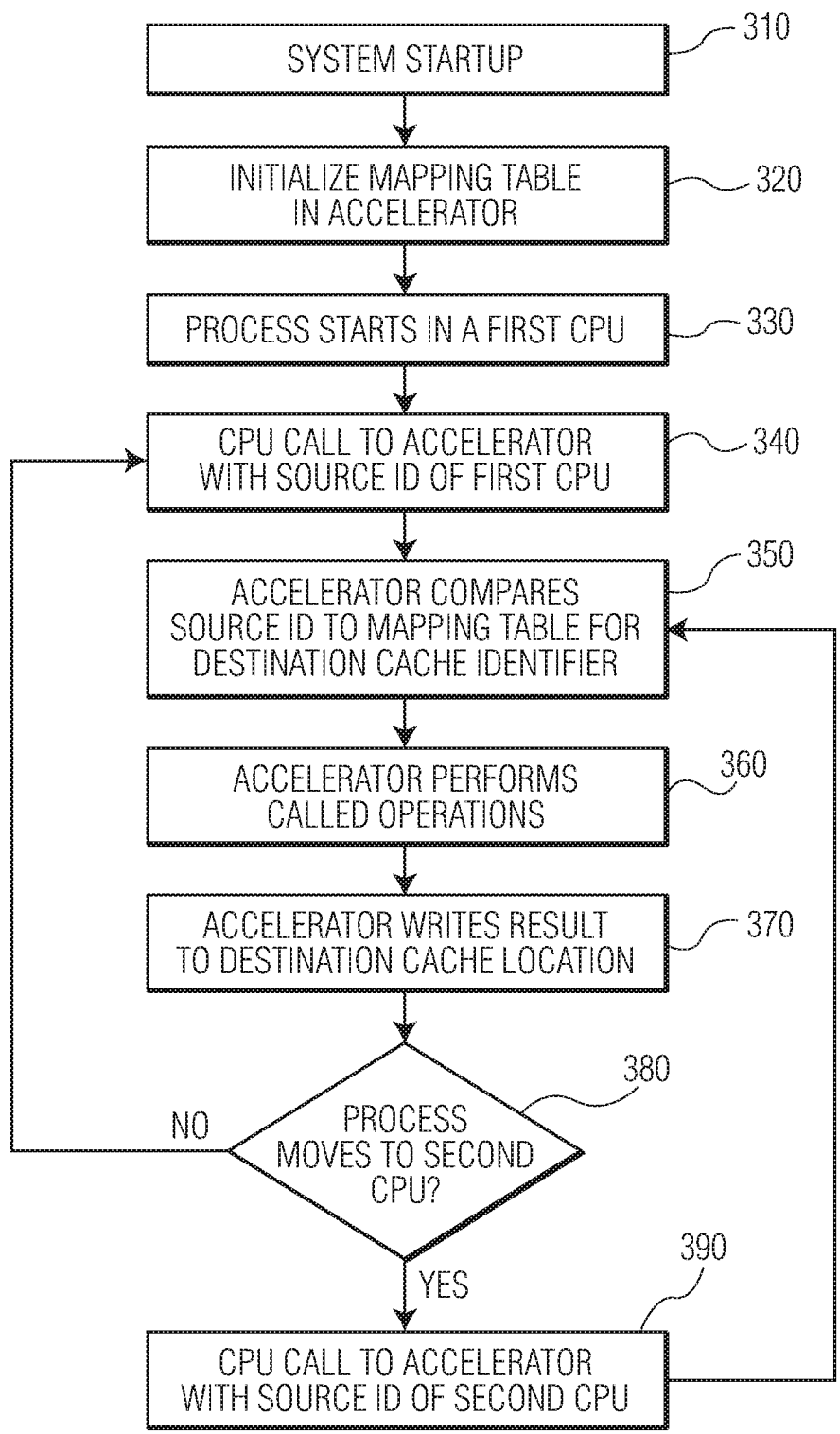
FIG. 3 is a simplified flow diagram illustrating an example of a process executed by logic in a hardware accelerator to update a cache identifier associated with a migrated software process.

FIG. 3 is a simplified flow diagram illustrating an example of a process executed by logic in a hardware accelerator to update a cache identifier associated with a migrated software process in accord with example embodiments of the present invention. As a first step, the system incorporating the hardware accelerator undergoes startup operations (310). Such startup operations can be executed by one or more of the processing cores incorporated in the system, as illustrated above, or a separate processor configured to manage operations of the system. As part of the system startup, the hardware accelerator mapping table (e.g., mapping table 230) is initialized with entries including at least cache identifiers, and in some embodiments the processor identifiers (320). Such initialization operations can be performed using information provided by the processor managing system initialization or through a polling operation of each of the system processor cores. Alternatively, entries of the mapping table can be permanently stored in hardware accelerator memory during manufacture of the system, thereby eliminating the need to initialize the mapping table on system startup.

After system startup, a software process can begin executing in a first CPU of the system (330). As part of the software process, instructions can cause the first CPU to make an operation call to the hardware accelerator (340). The operation call includes a source identifier of the first CPU, along with operation instructions for the hardware accelerator. In response to receiving the operation call, the hardware accelerator uses the source identifier of the first CPU to lookup entries within the mapping table in order to determine a destination cache identifier (350). The destination cache identifier can be, for example, a memory address that uniquely identifies a cache associated with the first CPU. In addition, the hardware accelerator performs the called operations (360). The results of the called operations are written by the hardware accelerator to the destination cache location (370).

If the software process continues to be executed by the first CPU (380), then subsequent operation calls to the hardware accelerator can continue to be written to the same cache memory. If the software process is migrated to a second CPU (380), then the second CPU can execute instructions causing the second CPU to make an operation call to the hardware accelerator (390). Since this operation call will include a source identifier of the second CPU, when the hardware accelerator performs a lookup of the mapping table entries using the source ID, a destination cache identifier associated with the second CPU will be retrieved and the hardware accelerator will write results of the operation instructions to the new destination cache.

In an alternative embodiment, the hardware accelerator does not perform a mapping table lookup associated with a subsequent operation call if the source identifier of the CPU is the same as that received previously associated with the software process. A determination can be made by the hardware accelerator as to whether the source identifier associated with the subsequent operation call matches that previously looked up. If so, then processing results can be provided to the same cache location.

A hardware accelerator incorporating an embodiment of the present invention responds to a migration of a software process from a first processor to a second processor. Results of called operations will be provided to a cache memory associated with the calling processor. Should the hardware processor be completing a first operation associated with a process while that process is migrated from a first processor to a second processor, the results of the first operation will be written to the cache associated with the first processor. Subsequent operations called by the second processor will be written to the cache associated with the second processor. The results of the first operation will be provided to the second processor by the normal cache coherency operations executed by the system. In this manner, the performance of the system is improved over systems that only utilize cache coherency to handle migration of software processes between processors.

By now it should be appreciated that there has been provided a hardware accelerator including receiver circuitry coupled to a source CPU and configured to receive and operation call from the source CPU including an identifier of the source CPU, a register configured to store the identifier of the source CPU, a memory coupled to the register and storing a mapping table that includes one or more entries where each entry includes a cache destination identifier associated with a CPU source identifier, and lookup circuitry coupled to the register and the memory and configured to determine the cache destination identifier associated with a CPU source identifier corresponding to the identifier of the source CPU.

One aspect of the above embodiment further includes transmit circuitry coupled to the source CPU and configured to transmit a result associated with the operation call to a memory cache associated with the cache destination identifier. In a further aspect, the hardware accelerator further includes processing circuitry configured to perform an operation associated with the operation call where the operation generates the result. In another further aspect, the receiver circuitry and a transmit circuitry are coupled to a plurality of CPUs and the source CPU is one of the plurality of CPUs. In still a further aspect, the mapping table includes a number of entries equal to a number of the plurality of CPUs. In another further aspect, the receiver circuitry is configured to receive the mapping table during and initialization of the hardware accelerator. In another further aspect, the entries of the mapping table are stored during manufacture of the hardware accelerator.

Another example embodiment provides a processing system including a plurality of CPUs where each CPU has an associated CPU identifier, a plurality of cache memories each coupled to an associated CPU of the plurality of CPUs where each cache memory has an associated cache destination identifier, and a hardware accelerator coupled to the plurality of CPUs and the plurality of cache memories. The hardware accelerator includes: a memory storing a mapping table where the mapping table includes one or more entries and each entry includes a cache destination identifier associated with a CPU identifier; lookup circuitry coupled to the memory and configured to determine the cache destination identifier associated with a CPU corresponding to a CPU identifier associated with an operation call to the hardware accelerator; and, transmit circuitry configured to transmit a result associated with the operation call to the cache memory associated with the determined cache destination identifier.

In one aspect of the above embodiment, the hardware accelerator further includes processing circuitry configured to perform an operation associated with the operation call where the operation generates the result. In another aspect, the mapping table includes a number of entries equal to a number of the plurality of CPUs. In yet another aspect, the entries of the mapping table are generated during and initialization of the processing system. In still another aspect, a CPU of the plurality of CPUs provides the entries of the mapping table to the hardware accelerator. In another aspect, the entries of the mapping table are stored during system manufacture.

Another example embodiment provides a method for performing hardware acceleration operations. The method includes: receiving a first operation call, at a hardware accelerator, from a first source CPU where the first operation call includes an identifier of the first source CPU; performing a lookup of a mapping table having one or more entries where the lookup is performed using the identifier of the first source CPU and each entry of the mapping table includes a cache destination identifier associated with the CPU identifier; generating a first result associated with the first operation call; and, writing the first results to a first cache memory associated with the cache destination identifier found during the lookup of the mapping table.

In one aspect of the above embodiment, a process associated with the first operation call executes on the first source CPU at a first time. In a further aspect, the method further includes: receiving a second operation call at the hardware accelerator from a second source CPU including an identifier of the second source CPU, where the process associated with the first operation call executes on the second source CPU at a second time and the process generates the second operation call; performing a second look up of the mapping table where the second lookup is performed using the identifier of the second source CPU; generating a second result associated with the second operation call; and writing the second result to a second cache memory associated with the cache destination identifier found during the second lookup of the mapping table. In a further aspect, the first and second source CPUs are members of a plurality of CPUs coupled to the hardware accelerator in a processing system and the mapping table includes a number of entries equal to a number of the plurality of CPUs.

In another aspect of the above embodiment, the method further includes generating the entries of the mapping table during and initialization of the processing system. In yet another aspect, the method further includes storing the entries of the mapping table during manufacture of the processing system.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also, for example, in one embodiment, the illustrated elements of system 100 are circuitry located on a single integrated circuit or within a same device. Alternatively, system 10 may include any number of separate integrated circuits or separate devices interconnected with each other. For example, main memory 140 may be located on a same integrated circuit as cores 120(1)-(N) or on a separate integrated circuit or located within another peripheral or slave discretely separate from other elements of system 100. Peripherals 170 may also be located on separate integrated circuits or devices. Also, for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable media such as memory 140 or other media on other computer systems. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 100 is a portion of a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A hardware accelerator comprising:
   receiver circuitry, coupled to a source CPU, configured to receive an operation call from the source CPU comprising an identifier of the source CPU;
   a register configured to store the identifier of the source CPU;
   a memory, coupled to the register, storing a mapping table, wherein the mapping table comprises one or more entries, and each entry comprises a cache destination identifier associated with a CPU source identifier; and
   lookup circuitry, coupled to the register and the memory, configured to determine the cache destination identifier associated with a CPU source identifier corresponding to the identifier of the source CPU.

2. The hardware accelerator of claim 1 further comprising:
   transmit circuitry, coupled to the source CPU, configured to transmit a result associated with the operation call to a memory cache associated with the cache destination identifier.

3. The hardware accelerator of claim 2 further comprising:
   processing circuitry configured to perform an operation associated with the operation call, wherein the operation generates the result.

4. The hardware accelerator of claim 2, wherein
   the receiver circuitry and the transmit circuitry are coupled to a plurality of CPUs, and
   the source CPU is one of the plurality of CPUs.

5. The hardware accelerator of claim 4 wherein the mapping table comprises a number of entries equal to a number of the plurality of CPUs.

6. The hardware accelerator of claim 4 wherein the receiver circuitry is configured to receive the mapping table during an initialization of the hardware accelerator.

7. The hardware accelerator of claim 4 wherein the entries of the mapping table are stored during manufacture of the hardware accelerator.

8. A processing system comprising:
   a plurality of CPUs, wherein each CPU of the plurality of CPUs has an associated CPU identifier;
   a plurality of cache memories, each cache memory coupled to an associated CPU of the plurality of CPUs, wherein each cache memory of the plurality of cache memories has an associated cache destination identifier; and
   a hardware accelerator, coupled to the plurality of CPUs and the plurality of cache memories, comprising
      a memory storing a mapping table, wherein the mapping table comprises one or more entries and each entry comprises a cache destination identifier associated with a CPU identifier,
      lookup circuitry, coupled to the memory, configured to determine the cache destination identifier associated with a CPU corresponding to a CPU identifier associated with an operation call to the hardware accelerator, and
      transmit circuitry configured to transmit a result associated with the operation call to the cache memory associated with the determined cache destination identifier.

9. The system of claim 8 wherein the hardware accelerator further comprises:
   processing circuitry configured to perform an operation associated with the operation call wherein the operation generates the result.

10. The system of claim 8 wherein the mapping table comprises a number of entries equal to a number of the plurality of CPUs.

11. The system of claim 8 wherein the entries of the mapping table are generated during an initialization of the processing system.

12. The system of claim 11 wherein a CPU of the plurality of CPUs provides the entries of the mapping table to the hardware accelerator.

13. The system of claim 8 wherein the entries of the mapping table are stored during system manufacture.

14. A method for performing hardware acceleration operations, the method comprising:
   receiving a first operation call, at a hardware accelerator, from a first source CPU wherein the first operation call comprises an identifier of the first source CPU;
   performing a lookup of a mapping table having one or more entries, wherein the lookup is performed using the identifier of the first source CPU, and each entry of the mapping table comprises a cache destination identifier associated with a CPU identifier;
   generating a first result associated with the first operation call; and
   writing the first result to a first cache memory associated with the cache destination identifier found during the lookup of the mapping table.

15. The method of claim 14 wherein a process associated with the first operation call executes on the first source CPU at a first time.

16. The method of claim 15 further comprising:
   receiving a second operation call, at the hardware accelerator, from a second source CPU comprising an identifier of the second source CPU, wherein
      the process associated with the first operation call executes on the second source CPU at a second time, and
      the process generates the second operation call;
   performing a second lookup of the mapping table, wherein the second lookup is performed using the identifier of the second source CPU;
   generating a second result associated with the second operation call; and
   writing the second result to a second cache memory associated with the cache destination identifier found during the second lookup of the mapping table.

17. The method of claim 16, wherein the first and second source CPUs are members of a plurality of CPUs coupled to the hardware accelerator in a processing system; and
   the mapping table comprises a number of entries equal to a number of the plurality of CPUs.

18. The method of claim 14 further comprising:
   generating the entries of the mapping table during an initialization of the processing system.

19. The method of claim 14 further comprising:
   storing the entries of the mapping table during manufacture of the processing system.

* * * * *